March 27, 1928.
T. M. EYNON
LIQUID LEVEL INDICATOR
Filed March 11, 1925
1,664,200
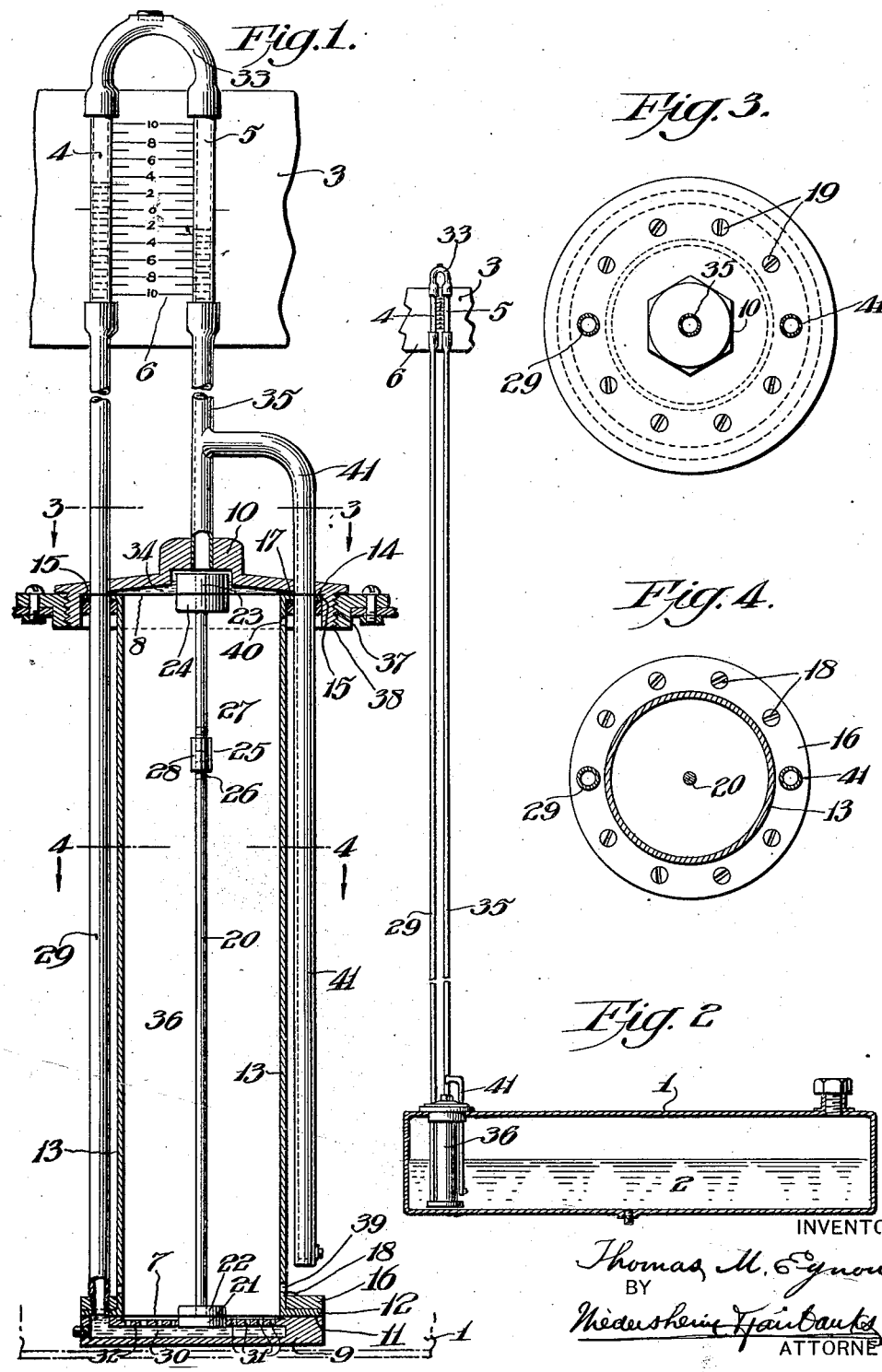

Patented Mar. 27, 1928.

1,664,200

UNITED STATES PATENT OFFICE.

THOMAS M. EYNON, OF PHILADELPHIA, PENNSYLVANIA.

LIQUID-LEVEL INDICATOR.

Application filed March 11, 1925. Serial No. 14,613.

My invention relates to a new and useful liquid level measuring device, gauge or indicator, whereby the level of the liquid in a vessel may be indicated on a scale located remotely from the liquid to be measured, and whereby an accurate reading may be obtained on said scale regardless of the pressure in said vessel and regardless of variations of temperature of the liquid or of the various parts of the instrument.

My invention relates particularly to a novel liquid level indicator, which is capable of general application, but is especially adapted for utilization in connection with the instrument board of an automobile to indicate the height of the gasoline level, and hence the quantity of gasoline, in the gasoline tank, and it relates more particularly to a liquid level indicator which is especially adapted for use in connection with the "pressure" system of gasoline storage and supply, commonly used on better grade of automobiles, although my invention is equally applicable to "gravity" or "vacuum" systems of gasoline supply on automobiles.

With the above ends in view my invention consists of a novel construction of an automatic liquid level indicating device, operated solely by the pressure caused on a pressure sensitive diaphragm on the bottom of the liquid, by the weight of the liquid above the diaphragm, and wherein the level indicated, will be independent of the pressure in the tank or on the surface of the liquid, and where in such tank pressure is compensated for, and its effect eliminated, by means of a second pressure sensitive diaphragm at the top of the tank; said two diaphragms being connected hydraulically to the two opposed sides of a gauge or indicator.

My invention further consists of a novel automatic liquid level indicating device having a minimum number of moving parts and which will register accurately regardless of the relative position and location of the tank with respect to the gauge glasses and which moreover is applicable to all gasoline tanks on motor cars regardless of where the same is located on the chassis.

For the purpose of illustrating my invention, I have shown in the accompanying drawings forms thereof which are at present preferred by me, since they have been found in practice to give satisfactory and reliable results, although it is to be understood that the various instrumentalities of which my invention consists can be variously arranged and organized and that my invention is not limited to the precise arrangement and organization of these instrumentalities as herein shown and described.

In the drawings in which like reference characters indicate like parts:—

Figure 1 represents a front elevation partly in section, of a fluid gauge embodying my invention.

Figure 2 represents a front elevation, on a reduced scale showing an application of my invention.

Figure 3 represents a section on line 3—3 of Figure 1.

Figure 4 represents a section on line 4—4 of Figure 1.

Referring to the drawings 1 designates a tank or other vessel containing a liquid 2 which is to be measured by indicating the level thereof. In the specific embodiment of my invention shown in the drawings, the tank 1 represents a gasoline or fuel tank of a motor car and is of the "pressure" type, wherein the gasoline or other fuel liquid is forced from the tank to the engine by means of gas pressure exerted on the surface of the liquid. My invention is equally applicable however to the "gravity" or "vacuum" type systems of fuel supply. 3 designates a portion of the instrument board of the automobile usually located remotely from the tank 1 containing the liquid to be measured, on which instrument board are mounted the gauge glasses 4 and 5 parallel to each other, and the scale 6 positioned between the two glasses.

My novel indicator consists chiefly of two diaphragms 7 and 8 secured to two heads 9 and 10 respectively, in a fluid tight manner as shown particularly in Figure 1, the lower diaphragm 7 being secured between the annular surface 11 of the lower head 9, and a corresponding flange 12 of a spacing cylinder 13; while the upper diaphragm 8 is secured between the annular surface 14 of the upper head 10, and the corresponding upper annular flange 15, of the spacing cylinder 13.

The rings or washers 16 and 17, and the screws 18 and 19 provide a tight joint between the respective heads and diaphragms, as shown in Figure 1. The diaphragms 7 and 8 may be made of any suitable resilient and pressure sensitive material which is impervious to the liquid to be measured, and which is at the same time not deteriorated, or in any way affected by such liquid.

In the particular embodiment of my invention shown in the drawings and to be described in detail hereinafter, the liquid 2 to be measured is gasoline or some other similar mixture of liquid hydrocarbons of mineral origin, and the diaphragms 7 and 8 are therefore preferably made of celluloid of a suitable thickness, which material has been found in practice to be durable, strong, and not effected by the solvent power of gasoline.

The spacing rod 20, extends between the centers of the two diaphragms 7 and 8, and is secured fixedly to said diaphragms by means of the two nuts 21 and 22, on the bottom and 23 and 24 on the top; the rod 20 passing through a small aperture in the center of each of said diaphragms. In order to permit the adjustment of the length of the rod 20, so as to permit the adjustment on the instrument, the rod is broken at 25, with the two ends 26 and 27 threaded in opposite directions, and has a corresponding threaded sleeve 28 connecting the two ends. Through a suitable pipe 29, preferably a thin copper tubing, a fluid-tight connection and liquid communication is established between the lower end of the gauge glass 4 and the chamber 30 of the lower head 9, which chamber in turn is in direct communication with the lower face of the diaphragm 7, through the series of apertures 31 provided in the upper wall 32 of the head 9. The upper end of the gauge glass 4 communicates with the upper end of the second gauge glass 5, through a suitable pipe connection or other fluid tight passageway 33, thereby forming an inverted U tube having the glass or other transparent limbs 4 and 5. The lower end of the gauge glass 5 in turn connects with the chamber 34 of the upper head 10 through a suitable pipe 35.

As will be seen from Figure 2 the measuring unit 36 is inserted into the tank 1 through a suitable opening 37 in the top of tank, into which opening it is secured by means of the threaded portion 38 on the outer head 10.

The measuring unit 36 thus inserted into the tank to the bottom thereof, will be directly immersed into the gasoline or other liquid contained in the tank. Through suitable openings 39 and 40 around the bottom and top of said spacing cylinder 13 a direct communication is established at all times between the liquid in the tank, and the diaphragms 7 and 8. Thus by filling the pressure chambers 30 and 34, the connecting tubes 29 and 35 and the indicator or gauge glasses 4 and 5 with a suitable liquid indicator medium, preferably a non-volatile vegetable oil, up to the level indicated approximately by the zero mark on the scale 6, any difference in pressure on the two diaphragms 7 and 8, will cause the diaphragm bearing the greater pressure deflect towards the corresponding pressure chambers, and to force the indicator liquid out of said chamber; thereby raising the level of the liquid medium in the corresponding gauge glass. Thus on filling the tank 1 with liquid such as gasoline the pressure on the lower diaphragm 7 will be greater than the pressure on the upper diaphragm 8, by an amount equal to the weight of the gasoline on said lower diaphragm, and the diaphragms being unbalanced, will raise the level of the liquid medium in the glass 4 from the zero position, and will lower the liquid medium a corresponding amount in the gauge glass 5. By suitably calibrating the scale 6, with respect to the particular tank 1, depending on the dimensions of the tank; the difference in the levels of the liquid medium in glasses 4 and 5, can be made to correspond to, and to indicate the level of, or the quantity of gasoline or other liquid in the tank 1; measured in any units desired such as quarts, gallons, or the like.

In order to completely equalize the normal or "zero" pressure on the two diaphragms 7 and 8, in the normal positions thereof, that is when the lower diaphragm is not submerged in a liquid, it is necessary that the exposed areas of the two diaphragms shall be exactly alike. In order to eliminate any inaccuracies in the readings on the gauge glasses 4 and 5, which might be caused by variations in the temperature of the liquid, or parts of the instrument, and the resulting unequal expansion of the liquid indicator medium contained therein, these two tubes must be substantially equal in length, and must be unexposed to the same variations of temperature as well as pressure. Since the tube 29 extends to the bottom of the measuring unit 36, namely to the lower head 9, and the tube 35 extends only to the top of said measuring unit 36, namely to the upper head 10, such tubes are of unequal length, and I, therefore, join to the lower end of the shorter tube 35, a tube 41 which is also filled with the liquid indicator medium and communicates with the tube 35, extends into the tank 1 and is substantially of a length to make the total or effective lengths of the two tubes 29 and 35 equal.

It will be apparent from the above description that by means of my novel measuring unit 36 and the cooperating gauge glasses 4 and 5, it is possible to measure the liquid in any tank, regardless of whether the pressure in such tank is atmospheric, above atmospheric, or below atmospheric. This wide applicability of my instrument is due to the fact, that regardless of whatever pressure may be in the tank or on the surface of the liquid contained therein, the two diaphragms 7 and 8 are affected equally by such pressure, since both diaphragms are exposed to it alike, and therefore the pressure within the tank or on the surface of the liquid will not be registered by the indicator liquid in the gauge glasses 4 and 5. It is only the difference in the pressures on the two diaphragms 7 and 8, caused by the weight of the liquid 2, containing in the tank 1, bearing on the lower diaphragm 7, which will be recorded or indicated in the gauge glasses 4 and 5.

Having thus described my invention, what I claim as new and desire to secure by Letters Patent, is:—

1. In a device of the character stated, a lower pressure sensitive diaphragm, an upper pressure sensitive diaphragm, means for retaining said diaphragms in constant relation to each other, and liquid conduits communicating with said diaphragms respectively for containing liquid columns adapted to be supported by said diaphragms for indicating the difference of pressures on said two diaphragms.

2. In a device of the character stated, a housing, a lower and an upper chamber at the respective ends of said housing, pressure sensitive diaphragms closing said chambers, an indicating device, passageways connecting said indicating device with said chambers, and a liquid indicating medium filling said chambers and said passageways.

3. In a device of the character stated, a lower and an upper head, chambers in said heads, a lower and an upper diaphragm closing the respective chambers in said heads, a housing common to said heads for retaining the same in constant spaced relation to each other.

4. In a device of the character stated, a lower and an upper head located at a fixed distance from each other, pressure chambers in said heads, pressure sensitive diaphragms closing said chambers, a continuous passageway connecting said two chambers having two substantially parallel and adjacent upright portions of a transparent material, a scale in proximity to said transparent portions, and a liquid indicating medium filling said chambers and said passageways to substantially the level of the center of said scale.

5. In a device of the character stated, a lower and an upper head located at a fixed distance from each other, pressure chambers in said heads, pressure sensitive diaphragms closing said chambers, a continuous passageway connecting said two chambers having two substantially parallel and adjacent upright portions of a transparent material, a scale in proximity to said transparent portions, and a liquid indicating medium filling said chambers and said passageways to substantially the level of the center of said scale, a means common to said two diaphragms for retaining the same in constant relation to each other.

6. In a device of the character stated, a lower and an upper head located at a fixed distance from each other, pressure chambers in said heads, pressure sensitive diaphragms closing said chambers, a continuous passageway connecting said two chambers having two substantially parallel and adjacent upright portions of a transparent material, a scale in proximity to said transparent portions, and a liquid indicating medium filling said chambers and said passageways to substantially the level of the center of said scale, a means common to said two diaphragms for retaining the same in constant relation to each other, a compensating tube communicating with the upper pressure chamber and extending into the liquid to be measured for compensating for temperature variations of the liquid.

7. In a device of the character stated, a liquid holding tank, a spacing member or housing passing through the top wall of said tank and extending in proximity to the bottom wall thereof, a lower and an upper chamber at the respective ends of said housing, pressure sensitive diaphragms closing said chambers, means remotely located with respect to said diaphragms and hydraulically connected with the same, for indicating the difference of pressures on said two diaphragms.

THOMAS M. EYNON.